United States Patent

[11] 3,585,401

[72] Inventor Heinz Georg Karl
Trangsund, Sweden

[21] Appl. No. 733,082
[22] Filed May 29, 1968
[45] Patented June 15, 1971
[73] Assignee Telefonaktiebolaget L. M. Ericsson
Stockholdm, Sweden
[32] Priority June 15, 1967
[33] Sweden
[31] 8446/1967

[54] AMPLITUDE DISCRIMINATOR
5 Claims, 7 Drawing Figs.

[52] U.S. Cl. .......... 307/235, 307/290, 307/293, 307/273, 328/115
[51] Int. Cl. .......... H03k 5/18, H03k 3/26
[50] Field of Search .......... 328/115, 116, 117, 146, 147, 150, 151; 307/290, 293, 235

[56] References Cited

UNITED STATES PATENTS

| | | | |
|---|---|---|---|
| 3,302,035 | 1/1967 | Greene | 307/215 |
| 3,378,701 | 4/1968 | Frank | 307/290 |
| 3,460,000 | 8/1969 | Kiffmeyer | 307/290 |
| 3,491,256 | 1/1970 | Simmons | 307/290 |

*Primary Examiner*—Donald D. Forrer
*Assistant Examiner*—L. N. Anagnos
*Attorney*—Hane and Baxley

ABSTRACT: An amplitude discriminator comprises a Schmitt-trigger circuit which receives the signal whose amplitude is to be monitored. The output of the Schmitt-trigger circuit is fed to a monostable multivibrator whose output is fed back to the input of the Schmitt-trigger circuit via a diode-capacitor circuit.

PATENTED JUN 15 1971

3,585,401

INVENTOR
HEINZ GEORG KARL
BY Hane and Baxley
ATTORNEYS

INVENTOR
HEINZ GEORG KARL
BY Hane and Baxley
ATTORNEYS

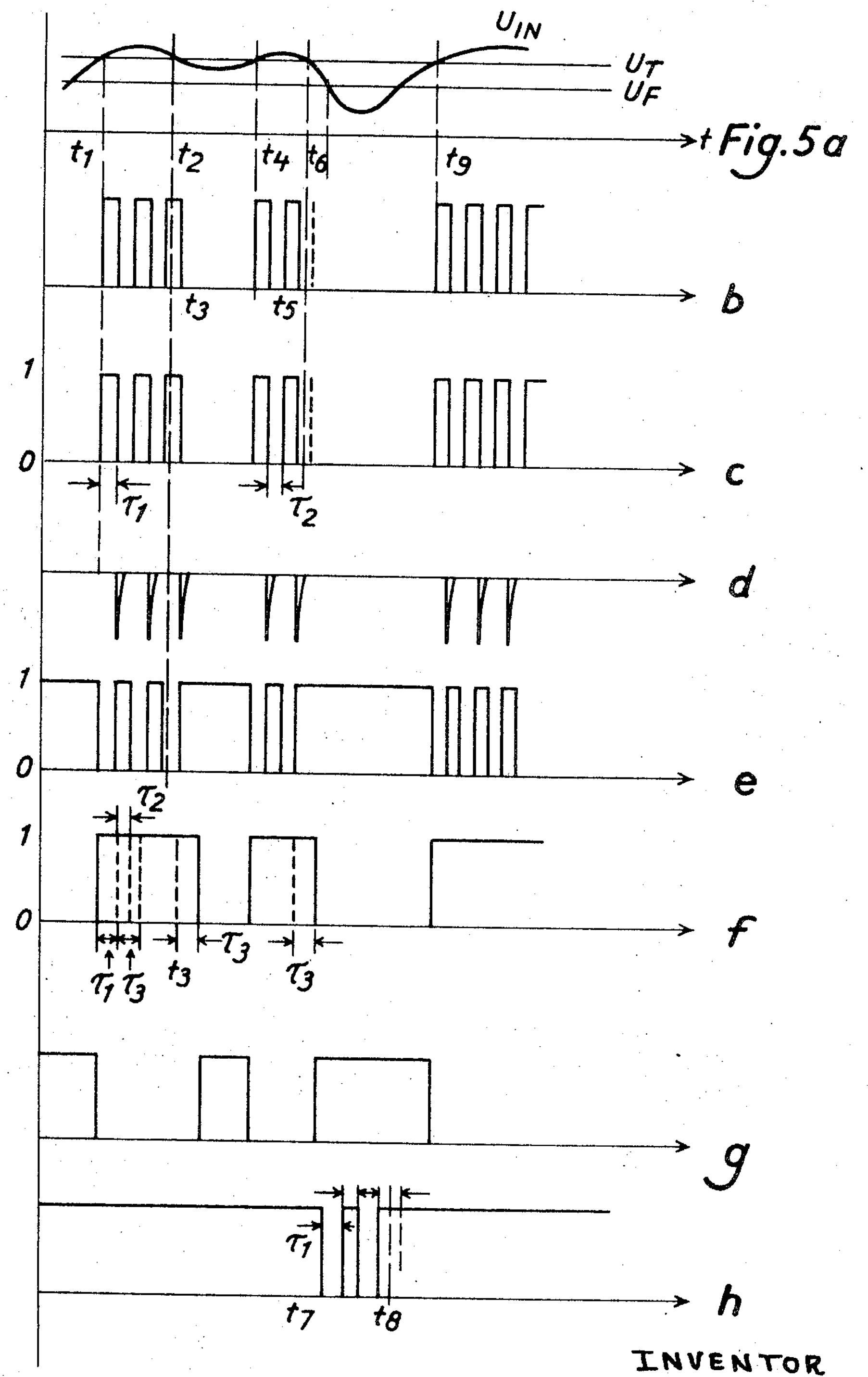
Fig. 5a b c d e f g h
INVENTOR
HEINZ GEORG KARL
BY Hane and Baxley
ATTORNEYS INVENTOR
HEINZ GEORG KARL
BY Horne and Barley
ATTORNEYS

AMPLITUDE DISCRIMINATOR

The present invention refers to an amplitude discriminator without hysteresis, intended to indicate whether an input voltage is above or below a definite threshold value.

The invention thus refers to an amplitude discriminator with no hysteresis. Such discriminators are used for indicating whether an analog signal of a definite curve shape is above or below a definite threshold value. A condition for such a discriminator is that it should switch at the same level regardless of whether the input voltage is rising or falling.

Figure 4:
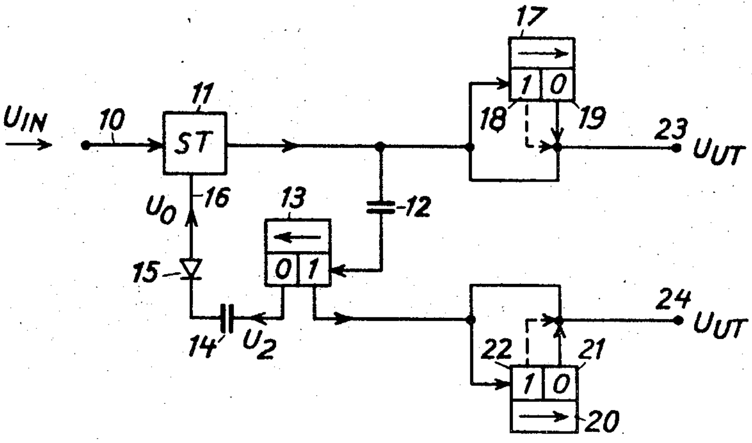
Figure 6:
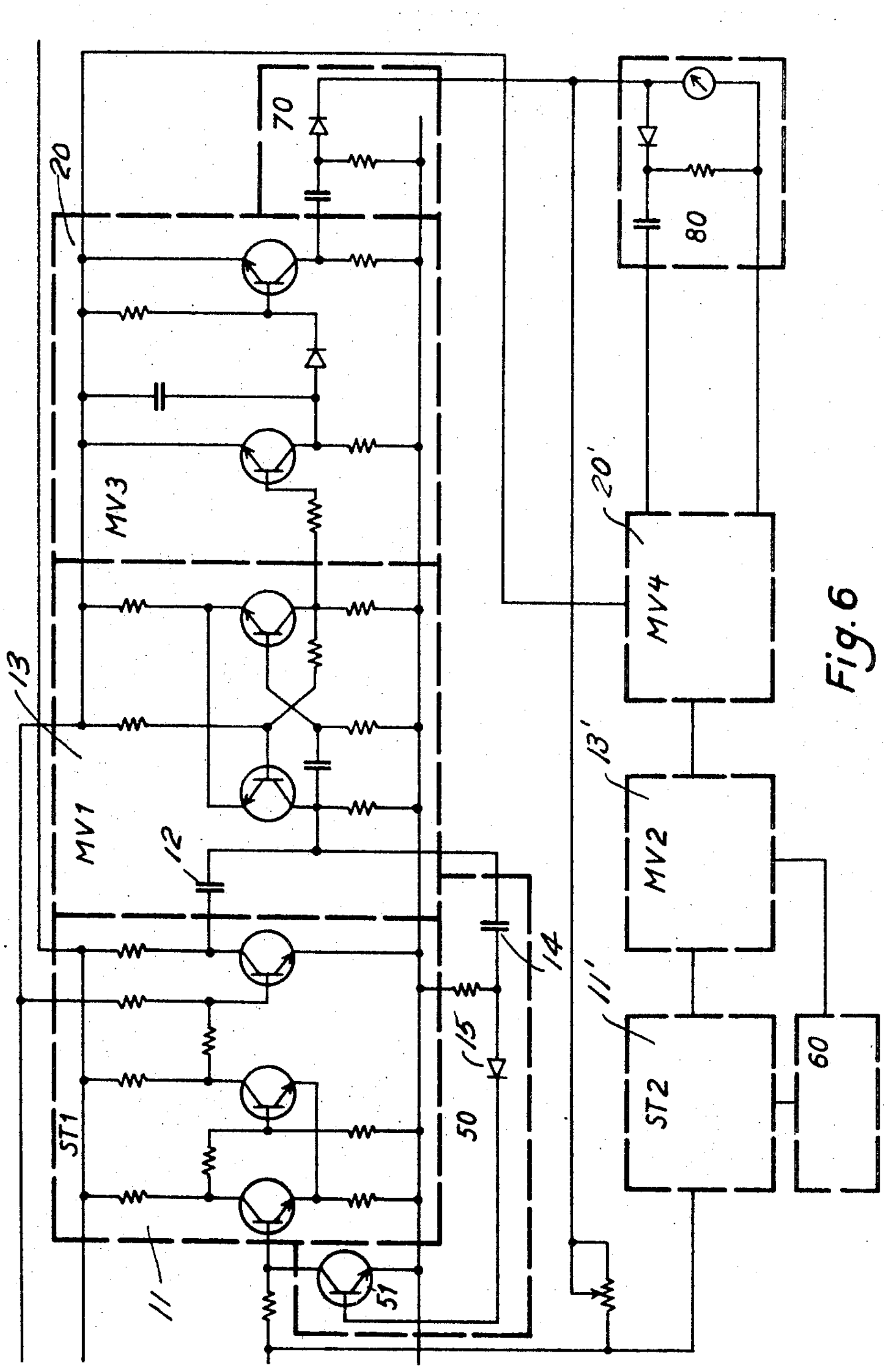

The invention will be more fully described in connection with the accompanying drawings, where FIG. 1, 2 and 3 indicate the voltage condition in arrangements known per se, where FIG. 4 shows an embodiment of the arrangement according to the invention, where FIG. 5 shows the voltage relations in this arrangement and where FIG. 6 shows two arrangements connected in parallel according to the invention.

Figures 1A, 1B:
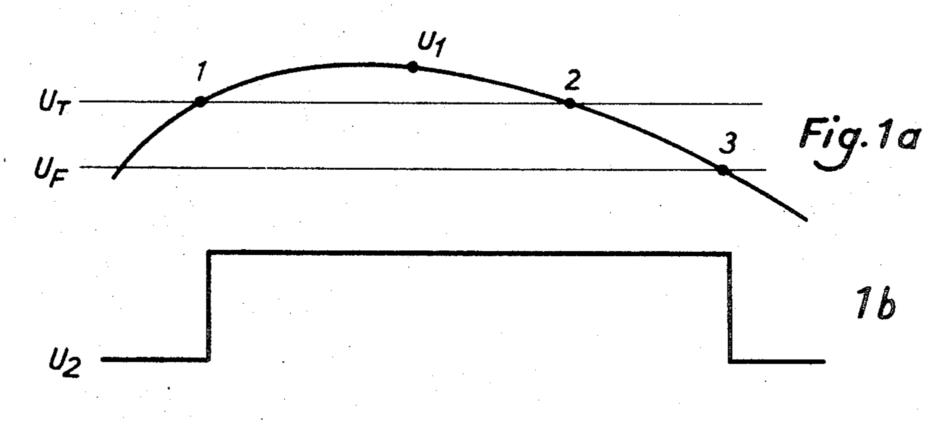

An ordinary amplitude discriminator, for example of the Schmitt type has hysteresis as illustrated in FIG. 1, where FIG. 1*a* shows the analog voltage U1 that is to be sensed by the discriminator and where FIG. 1*b* shows the output voltage U2 obtained from the discriminator. In FIG. 1*a* the line UF represents the release value of the discriminator and the line UT represents the operation value of the discriminator. If the input voltage U1 is increased so that it becomes equal to or larger than level UT (point 1) the discriminator changes from a released to an operated position. When the voltage U1 is then decreased and falls below the value UT (point 2) the discriminator does not change at this point but changes only when the voltage has a value that is equal to or smaller than value UF.

Figure 2A:
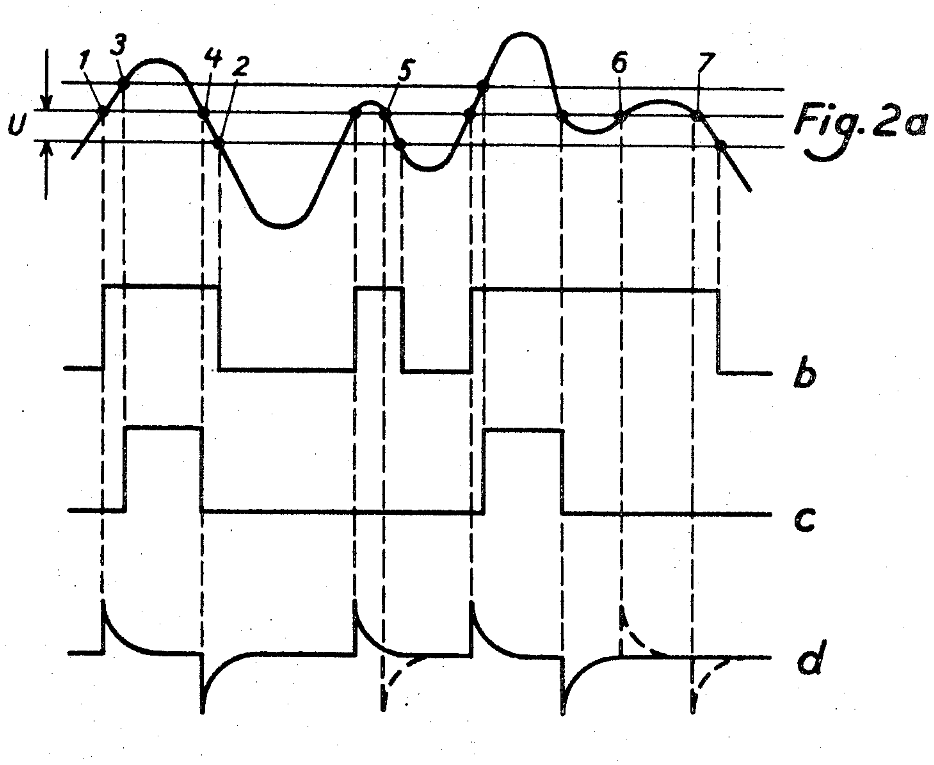
Figure 3A:
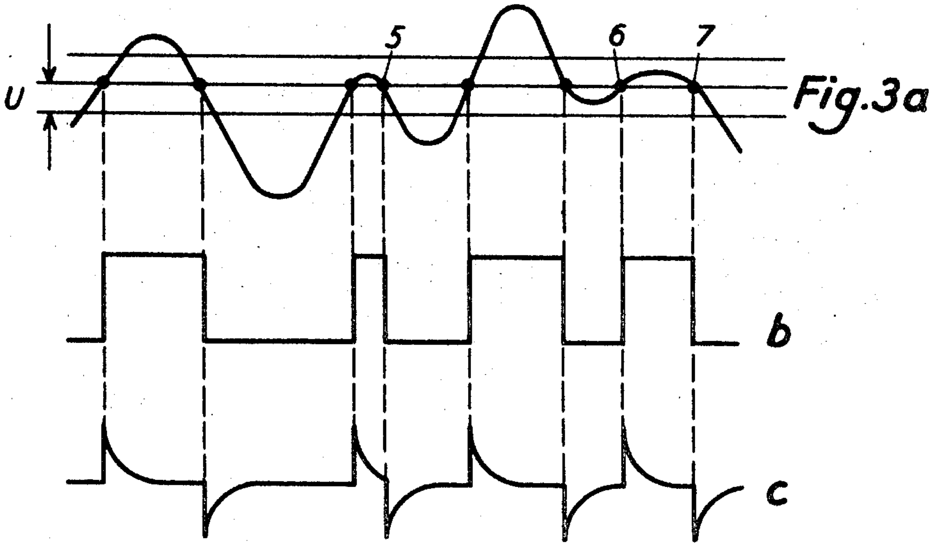

In order to avoid these disadvantages various flip-flop circuits have been used. One arrangement comprises two flip-flop circuits which are connected in parallel to an input. The circuits are arranged in such a way that one of them is always released at a certain value in relation to the threshold value at a falling input voltage and that the other one operates at a corresponding value in relation to the threshold value at an increasing input voltage. The operation of an arrangement of this kind is shown in FIG. 2, where FIG. 2*a* shows the input voltage, FIGS. 2*b* and 2*c* show the output voltage from the flip-flop circuits and FIG. 2*d* shows the resulting output voltage from the arrangement. From FIG. 2 it appears that at the points 5, 6 and 7, where the input voltage passes the threshold value, no output pulses are obtained because of hysteresis. In FIG. 2*d* lines indicate the pulses that would have been obtained in these points. Another arrangement comprises two Schmitt-trigger circuits having inputs connected in parallel to the input of the arrangement. The circuits are arranged in the same way as in the previous arrangement. In the arrangement with Schmitt-trigger circuits, however, the output of one of the circuits is connected to the input of the other circuit by means of a connecting network such as a capacitor. The operation of such a circuit is shown in FIG. 3, where FIG. 3*a* shows the input voltage, FIG. 3*b* shows the output voltage of one Schmitt-trigger, the other being the same, and FIG. 3*c* shows the resulting output voltage from the arrangement. As appears from FIG. 3*c* output pulses are also obtained at the points 5, 6 and 7 of the input voltage of the arrangement.

However, this circuit has disadvantages. In series production it has proved to be practically impossible to set the operation point of one of the Schmitt-triggers to exactly the same value as the release point of the other Schmitt-trigger. It is furthermore impossible to design the two circuits with the same temperature dependence, the same excitation voltage dependence and the same aging without special and expensive measures. In practice therefore, this arrangement also has a certain hysteresis.

The amplitude discriminator according to the invention however has no hysteresis and can, without difficulty, be produced on a large scale. The arrangement is mainly characterized in that a trigger or switch circuit is arranged to work on one of its threshold values, the operation—or the release value, that a time circuit, for example a monostable multivibrator circuit, is connected to the output of the trigger circuit and arranged to be controlled by the output voltage from the trigger circuit and to return to its rest position after a time determined by the time circuit; that a capacitor is connected in series with a diode between one of the outputs of the time circuit and the input of the trigger circuit, a pulse being obtained at the other input of the trigger circuit when the monostable multivibrator circuit returns to its rest position, so that the trigger circuit is set to zero and one respectively, and whereat the trigger circuit when the pulse has terminated is again activated in dependence of the value of the input voltage, the time circuit being activated and generating a new pulse for the zero- and one-setting, respectively, of the circuit until the input voltage is below or above the threshold value.

An amplitude discriminator according to the invention is shown broadly in FIG. 4 to generally explain the philosophy of operation of the discriminator. An input voltage V*in* is applied to the input 10 of the discriminator. The discriminator comprises a switch circuit 11, for example a Schmitt-trigger, the output of which is connected to the output 23 of the discriminator and a differentiating capacitor 12. The capacitor 12 is connected to a time circuit or monostable multivibrator 13. Monostable multivibrator 13 which is triggered by Schmitt-trigger 11 is connected to the input 16 of the Schmitt-trigger 11 via a capacitor 14 and a diode 15. In the discriminator circuit used in the present invention only one of the two threshold values is utilized, either the operation value or the release value. At a change from the rest position to the operated position the monostable multivibrator 13 is activated, which then restores the Schmitt-trigger to the released position. After the release the discriminator again tests whether the input voltage is still larger than the threshold value of the discriminator. If this is the case the Schmitt-trigger is again operated. A new pulse then reaches the monostable multivibrator 13, which again sets the Schmitt-trigger to zero. The Schmitt-trigger again tests the input voltage and so on until the input voltage has fallen below the threshold value of the discriminator. Because the discriminator always scans the input voltage in one direction, that is whether it is larger or smaller than the operation value of the discriminator for operation, it does not have any hysteresis because the threshold value for release is not included in the discriminator function. The threshold value for release only determines the value of the smallest required zero-setting pulse.

The operation will be described in connection with FIG. 5, where FIG. 5*a* shows the input voltage U*in*, FIG. 5*b* shows the voltage of the output 23, FIG. 5*c* shows the voltage obtained from the monostable multivibrator 13, FIG. 5*d* shows the voltage supplied to the input 16 of the Schmitt-trigger, FIG. 5*e* shows the inverted voltage obtained at the output 24, FIG. 5*f*, 5*g* and 5*h* show the output voltages obtained when a further monostable multivibrator 17 is connected to the outputs 23 and 24.

At the point of time $t1$ the input voltage U*in* is above the threshold value of Ut of the Schmitt-trigger 11 for operation and the Schmitt-trigger operates. Its output voltage reaches the output 23 at the same time as it is supplied to the monostable multivibrator 13 via the capacitor 12. The multivibrator 13 changes from 0-position to 1-position and remains in this position during the time $\tau 1$ corresponding to the relaxation time for the monostable multivibrator 13. Thereafter the monostable multivibrator 13 automatically returns to its rest position. At the change from 0-position to 1-position (the point of time $t1$) a positive pulse is obtained from the capacitor 14, the pulse being blocked by the diode 15. When the monostable multivibrator 13 changes from 1- to 0-position a negative pulse is obtained, which after having passed through the diode 15 reaches the input 16 at the point of time $t1+\tau 1$. These pulses are shown in FIG. 5*d*. This voltage sets the Schmitt-trigger or switch circuit 11 to zero, which will remain zero-set until the capacitor 14 has been discharged, that is during the time $\tau2$. Thereafter, the switch circuit 11 operates again if the input voltage is still larger than the threshold value *Ut*. The process is repeated until the input voltage is smaller than the threshold value for operation *Ut* (the point of time *t*2). At the point of time *t*2 the switch circuit 11 should return to its rest position, but it does not return until it has been set to zero by the monostable multivibrator 13 which takes place at the point of time *t*3. Thus *t*3 <(*t*2$\tau$1).

At the point of time *t*4, U*in* is again above U*t* and so the switch circuit 11 operates again and the previously described process is repeated. At the point of time *t*6, U*in* will again be smaller than U*t*. Here the switch circuit 11 is set to zero at *t*5 and will remain zero-set during the time *t*5+$\tau$2. During this time interval U*in* becomes smaller than U*t*. As *t*6 < (*t*5+$\tau$2), the switch circuit 11 will therefore no longer operate. A release of the switch circuit 11 with a negative delay smaller than the duration ($\tau$2) of the pulse will thus be obtained, while in the previous case a positive delay smaller than the time $\tau$1 was obtained.

This delay with the time $\tau$1 and $\tau$2 respectively has however no influence on the measure precision for the supervision of the voltage amplitude and the precision in the voltage discrimination. It does not introduce any hysteresis but it only determines the time resolution capacity, that is how short the distance *t*2 —*t*4 can be allowed to be for enabling the equipment to indicate. By using modern semiconductor components it is then possible to work in the nanosecond range.

A voltage discriminator with hysteresis would here release neither at *t*2 (respectively *t*3) nor at *t*6 (respectively *t*5) but only at *t*7.

On the output 23 of the arrangement is obtained a pulse train shown in FIG. 5*b*. The length *t*3-*t*1 = *t*2–*t*1+(<$\tau$1) and *t*5–*t*4 = *t*6–*t*4–(<$\tau$2) of the pulse train corresponds to the time intervals where U*in* is smaller than U*t*

At the output 24 of the arrangement, which is connected to the other output of the monostable multivibrator 13, an inverted pulse train is obtained, which is shown in FIG. 5*e*. If, during the time the switch circuit 11 operates, it is desired to obtain one single pulse instead of, pulse train a further monostable multivibrators 17 and 20 are connected in series with the output 23 and the output 24, respectively. The multivibrators are then arranged in such a way that they change from 0-position to 1-position (output 18 and 22 respectively) as soon as the switch circuit 11 operates at the point of time *t*1 and remains in this position during the time $\tau$1, that is as long as the monostable multivibrator 13 and the switch circuit 11 are operated. When the monostable multivibrator 13 after the time $\tau$1 changes to 0, the monostable multivibrator 17 and 20 respectively remain in position 1 for still some time $\tau$3. The time $\tau$3 hereby corresponds to the relaxation time of the multivibrator 17 and 20 respectively. If time $\tau$3 is chosen so that it is larger than the zero-setting time $\tau$2 for the switch circuit 11, the monostable multivibrators 17 and 20 respectively will at the point of time (*t*1+$\tau$1+$\tau$2) be in position 1 when the switch circuit 11 and the monostable flip-flop 13 will again be in operated position, which has as a result that the monostable multivibrators 17 and 20 respectively will remain operated. This means that before the monostable multivibrators 17 and 20 respectively can return to position 0 (at the point of time *t*1+$\tau$1+$\tau$3), a new trigger pulse is supplied to the input of the monostable multivibrators 17 and 20 respectively (the point of time *t*1+$\tau$1+$\tau$2) which pulse keeps the monostable multivibrators 17 and 20 respectively in position 1. Not until the switch circuit 11 and the monostable multivibrator 13 at the point of time *t*3 (respecitvely *t*5) return to position 0 the monostable multivibrators 17 and 20 respectively will also after a time delay $\tau$3 return to position 0.

If instead, the output 19 of the multivibrator 17 is connected to the output 23 and the output 21 of the flip-flop 20 is connected to the output 24, instead an inverted pulse is obtained as shown in FIG. 5*g*.

If one does not want to use the threshold value for operation U*t* of the Schmitt-trigger 11 but instead the threshold value for release, the switch circuit 11 is not set to zero but to one by means of the multivibrator 13. FIG. 5*h* shows the output voltage from the Schmitt-trigger 11 when the voltage indicates that the input voltage U*in* is smaller than the threshold value for release U*f*. Only the figure which corresponds to FIG. 5*b* is shown. Figures corresponding to FIG. 5*c*—5*g* have an analogous character but the voltages are inverted. The Schmitt-trigger is here operated as long as voltage U*t* is larger than voltage U*t* and does not release until U*in* is smaller than U*f* (the point of time *t*7). During the time *t*7—*t*8 the switch circuit 11 tests continuously whether U*in* is still smaller than U*f*. This thus takes place by a one-setting of the switch circuit 11 through the monostable multivibrator 13. After the point of time *t*8 U*in* is again larger than U*f* and the switch circuit 11 remains operated.

In FIG. 6 is shown an arrangement comprising two parallel circuits in accordance with the invention. The arrangement includes two switch circuits ST1 and ST2 of the Schmitt-trigger type. The switch circuit ST1 is arranged to work on its threshold value for operation, i.e. it should indicate whether the input voltage to the arrangement is above a certain value, which is identical with level U*t*. The switch circuit ST2 is arranged to work on its threshold value for release. It should thus indicate when voltage U*in* is below a certain value identical with the threshold value U*f* for release. The arrangement furthermore comprises two monostable multivibrators MV1 and MV2, each of which corresponds to the multivibrator 13 in FIG. 4. From the multivibrator MV1 are obtained inverted pulses, from the multivibrator MV2 noninverted pulses. This corresponds to the shifting between 0 and 1 on the outputs of the multivibrator 13. The units 50 and 60 correspond to the network comprising the capacitor 14 and the diode 15 of FIG. 4. The zero-setting of switch ST1 takes place via a transistor switch 15, short-circuiting the base of the first transistor in the switch circuit ST1 with the emitter and thereby setting the switch circuit ST1 in a released position (equal to zero). The one-setting of the switch circuit ST2 takes place in an analogous way. A transistor switch short-circuits the base of the first transistor with the collector and thus sets the switch circuit ST2 in an operated position (equal to one).

Elements MV3 and MV4 are two monostable multivibrators corresponding to the multivibrator 20 respectively in FIG. 4. The arrangement furthermore comprises the units 70 and 80, which are constructed for the reading of indicating values.

In other words, the device of FIG. 6 corresponds to two discriminators. One discriminator which senses the level U*t* comprises switch circuit ST1, monostable multivibrator MU1, coupling network 50, and monostable multivibrator MU3. The other discriminator which senses the level U*f* comprises switch circuit ST2, monostable multivibrator MU2, coupling network 60 and monostable multivibrator MU4. Each of the discriminators operates in a manner similar to the device of FIG. 4. In fact, to show the similarities, like elements have been equated by using the same reference numbers and the primes thereof.

I claim:

1. An amplitude discriminator without hysteresis adapted to be triggered by an arbitrary input signal and to indicate whether the input signal is above or below a definite threshold value, said discriminator comprising:

a bistable trigger circuit having input means including a signal input for triggering the circuit to one of the stable positions and a control input for restoring the circuit to the other of the stable positions, said signal input being the input of said discriminator and being adapted to receive the arbitrary input signal;

a first monostable timing circuit having an astable position and a rest position and having an input and at least one output which emits a signal when in the astable position;

means for connecting the input of said first monostable timing circuit to the output of said trigger circuit; and a diode-capacitor series circuit connected between the output of said first monostable timing circuit and the control input of said trigger circuit so as to obtain a pulse at the control input of said trigger circuit when said monostable circuit returns to the rest position for restoring said trigger circuit to the other of said bistable positions.

2. The amplitude discriminator of claim 1 wherein said bistable trigger circuit is a Schmitt-trigger circuit.

3. The amplitude discriminator of claim 2 and further comprising a transistor switch at the control input of said Schmitt-trigger circuit for applying a given voltage to the signal input of said trigger circuit upon receipt of a pulse from said diode-capacitor series circuit.

4. The discriminator of claim 1 and further comprising a second monostable timing circuit connected to the output of said trigger circuit.

5. The discriminator of claim 1 and further comprising a second monostable timing circuit connected to the output of said first monostable timing circuit.